Dec. 21, 1965 J. DOLLINGER 3,225,147

TELEPHONE HANDSET SUPPORT

Filed Sept. 26, 1961 2 Sheets-Sheet 1

INVENTOR.
JOSEPH DOLLINGER

Dec. 21, 1965 J. DOLLINGER 3,225,147

TELEPHONE HANDSET SUPPORT

Filed Sept. 26, 1961 2 Sheets-Sheet 2

INVENTOR.
JOSEPH DOLLINGER

United States Patent Office 3,225,147

Patented Dec. 21, 1965

3,225,147

TELEPHONE HANDSET SUPPORT

Joseph Dollinger, 190 Dover St., Brooklyn 35, N.Y.

Filed Sept. 26, 1961, Ser. No. 140,837

5 Claims. (Cl. 179—156)

This invention relates to telephones and, more particularly, to an accessory therefor.

It is an object of the present invention to provide a handset support for handset type telephones which will enable the handset to be supported in a talking position in a comfortable and convenient manner.

A further object of the present invention is to provide a telephone handset support of the type described which can be conveniently folded into a storage position alongside of the handset when not in use, opened for use whenever required, and adjusted to the size of the intended user.

All of the foregoing and still further objects and advantages of this invention will become apparent from a study of the following specification, taken in connection with the accompanying drawing, wherein.

Figures 1, 2, 3, 4, 5, 6, 7, 8, 9, 10, 11, 12:
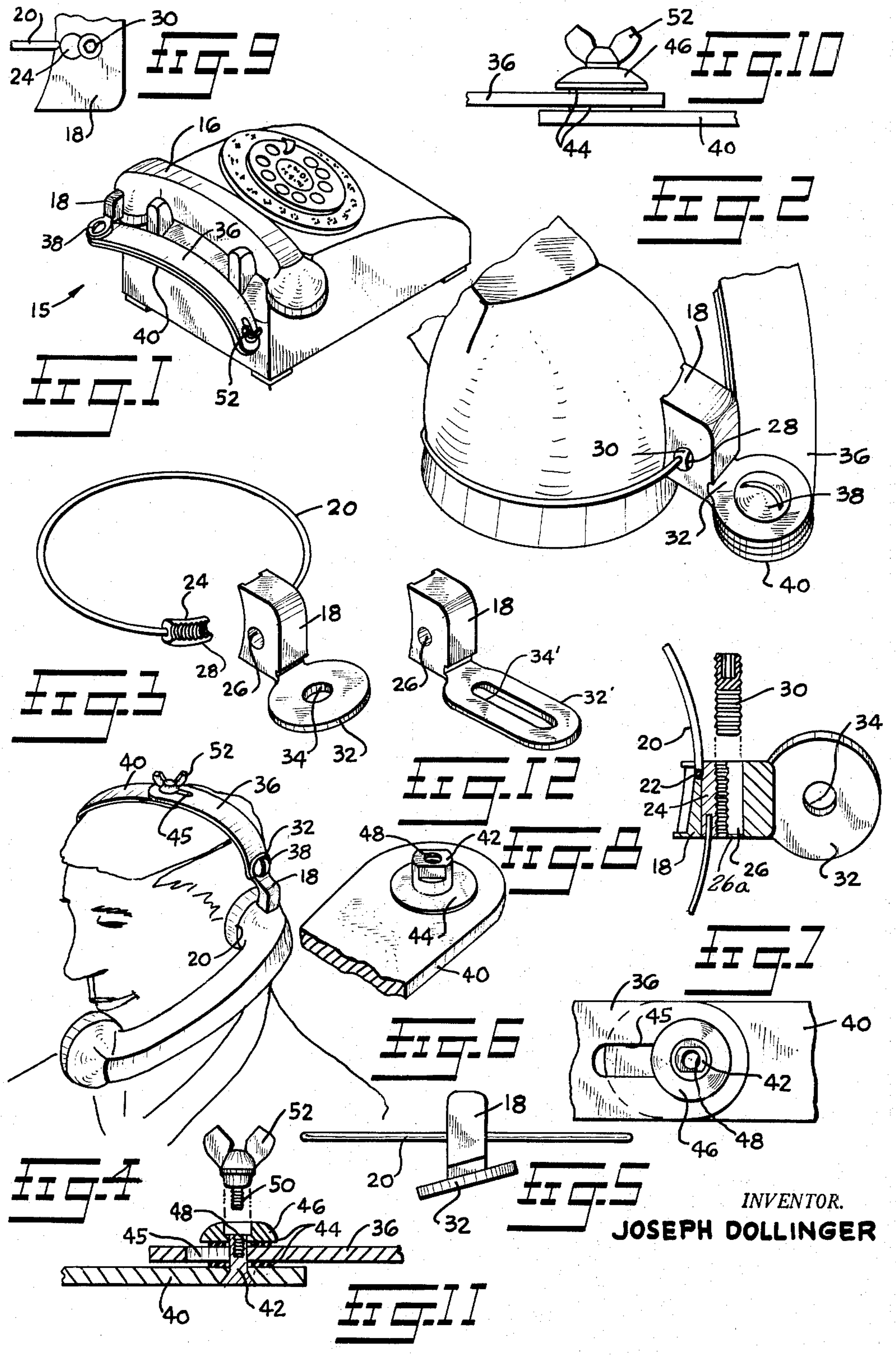
FIGURE 1 is a perspective view of a telephone handset support made in accordance with the present invention applied to a telephone handset.
FIGURE 2 is an enlarged fragmentary perspective view of certain parts of the present invention.
FIGURE 3 is an exploded perspective view of certain bracket elements of the present invention.
FIGURE 4 is a perspective view of the device shown in FIGURE 1 in actual use.
FIGURE 5 is a fragmentary plan view of certain parts of the device shown in FIGURE 3.
FIGURE 6 is an enlarged fragmentary perspective view of a coupling element forming another part of the present invention.
FIGURE 7 is a fragmentary plan view of certain other parts of the present invention.
FIGURE 8 is a fragmentary exploded cross sectional view of the elements shown in FIGURE 3.
FIGURE 9 is a fragmentary plan view of the elements shown in FIGURE 8 in an installed position.
FIGURE 10 is an enlarged fragmentary side elevational view of certain other parts of the present invention.
FIGURE 11 is a cross sectional view of the device shown in FIGURE 10 with certain parts removed.
FIGURE 12 is a perspective view of a slightly modified form of bracket structure.

Referring now to the drawing, a telephone handset support assembly 15 made in accordance with the present invention is shown to include a main mounting member 18 that is secured to the side of the telephone handset 16 adjacent to the receiver end thereof by means of a wire band 20 having one end 22 anchored upon the mounting member 18.

The opposite end of the band 20 is secured to the cylindrical plug 24 having an internally threaded bore 28 opening outwardly along a side thereof. This plug 24 is received within an opening 26 in the mounting member 18 and threadedly engaged by a set screw 30 which is also slidably received within the bore 26. Thus, by threadedly inserting the set screw 30, the plug 24 is drawn further into the opening 26, thus tightening the band 20 around the receiver end of the handset to secure the assembly in place. The opening 26 includes a shoulder 26*a*, at the base of the said opening for engaging the set screw 30, and preventing it from passing through the opening 26.

The mounting member 18 is also provided with a circular plate 32 having an aperture 34 for receiving a bolt 38 for mounting one element 36 of a combined head band thereupon for limited pivotal movement. Another head band element 40 is connected to the free end of the one head band element 36 by means of a non-circular stud portion 42 which is slidably received in a longitudinal adjustment slot 45 of the first head band element 36.

A pair of friction washer elements 44, one mounted on each side of the first head band element 36 upon the mounting post 42, serves to resist movement of the head band elements when clamped in place by a pressure washer 46 acted upon the base of a wing bolt 52 having a stud portion 50 threadedly received within a bore 48 of the stud 42.

Reference is now made to FIGURE 12 of the drawing, which illustrates a slightly modified form of mounting plate 32′, which has an elongated slot 34′, which adjustably and slidably receives the mounting bolt 38 to provide a further size adjustment for the combined head band supported thereon.

Figures 13, 14, 15:
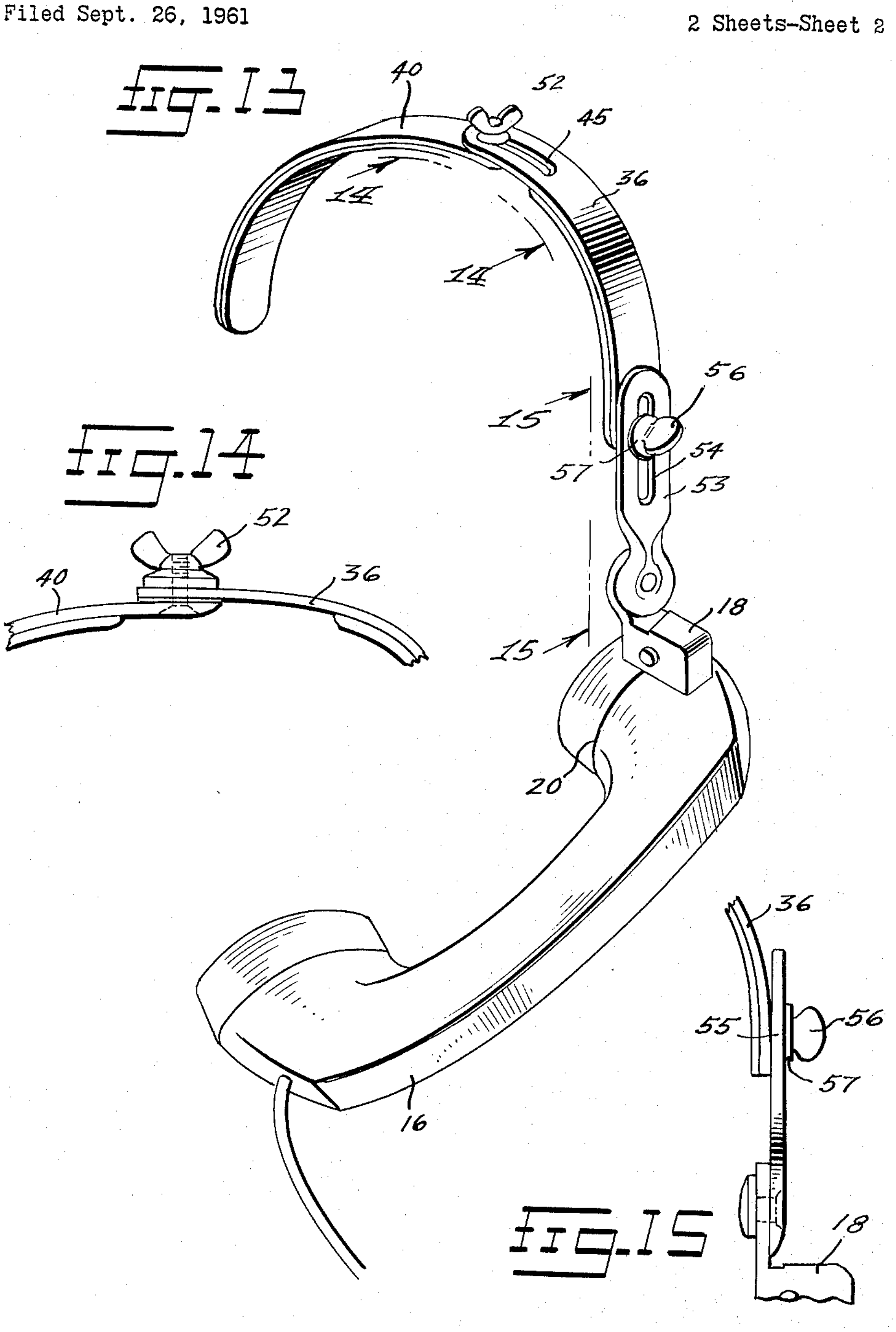
FIGURE 13 is a perspective view of a modification of the invention.
FIGURE 14 is a side view of a portion of the modification of FIGURE 13.
FIGURE 15 is a side view of another portion of the modification of FIGURE 13.

The modification depicted in FIGURES 13, 14 and 15 incorporates additional features which make the head rest support more adjustable to comfortably fit all head sizes. The element 36 is adjustably secured to number 18 by slide 53 which is pivoted to member 18. A groove 54 formed in slide 53 to receive a boss 55 mounted on element 36. Boss 55 is shaped to slide in groove 54 but is not rotatable. A wing bolt 56 is threaded into boss 55 and exerts friction producing pressure on a washer 57 whereby the slide 53 and element 36 can be retained at various longitudinal positions to adapt to varying head depths.

It will now be recognized that the head rest support assembly as depicted in both forms is readily opened from the normally collapsed position mounted on the telephone in FIGURE 1, to the operative position on the user's head in a simple and efficient manner whenever required, and when so opened, provides a comfortable and convenient support for the handset during use.

Another important feature of the present invention is that this device can be applied to the handset without permanently damaging the handset or violating the mechanical working set of the telephone handset.

While this invention had been described with particular reference to the construction shown in the drawing, it is to be understood that such is not to be construed as imparting limitations upon the invention, which is best defined by the claims appended hereto.

What I claim as new and desire to protect by Letters Patent of the United States is:

1. A telephone handset support comprising in combination a rigid block for mounting upon a telephone handset and radially outward relative to the receiver end of the handset, an annular wire band for securing said main mounting block to the receiver end of said handset, said wire having one end secured to said block, and its other end adjustably received within said block for tightening said wire band on said handset receiver end, a folding headband pivotally mounted upon said mounting block for movement between a normally folded and open position, and means for adjusting the size of said headband.

2. A telephone handset support as set forth in claim 1, wherein said headband is formed by a pair of band elements, and said adjusting means, comprising a longitudinal slot in the end of one of said band elements, an elongated threaded member connected to one end of the other band member, and extending therefrom and through the slot, having a stud slidingly received within said slot, and a nut cooperating with the said stud for securing the said bands at a desired relative location with respect to each other.

3. A telephone handset support as set forth in claim 2, wherein said band elements are of substantially equal length, and are pivotal relative to each other on said elongated threaded stud, so that the support when folded and stored, has a total length limited to the length of one of said bands and the handset to which it is attached.

4. A telephone handset support as set forth in claim 3, wherein said block has an arm extending radially therefrom, and elongated fastener extending through one of said band elements and said arm pivotally connecting said headband to said block, said arm spacing said headband from the handset to which the support is attached for passage of a telephone cradle when said headband is folded and in stored position substantially parallel to the handset to which the support is connected.

5. A telephone handset support as set forth in claim 4, wherein said arm has an elongated slot, said elongated fastener being movable along such slot to a predetermined position and cooperating with said threaded member being positionable in said slot in one of said band elements to provide means for adjusting the distance that said headband is spaced from the handset.

References Cited by the Examiner

UNITED STATES PATENTS

| | | | |
|---|---|---|---|
| 295,983 | 4/1884 | Cook et al. | 179—156 |
| 1,148,941 | 8/1915 | Wier | 179—156 |
| 2,020,084 | 11/1935 | Sidders | 179—156 |
| 2,481,387 | 9/1949 | Bonecutter | 179—156 |
| 2,843,680 | 7/1958 | Pollard | 179—156 |

FOREIGN PATENTS

| | | |
|---|---|---|
| 254,958 | 1/1949 | Switzerland. |

ROBERT H. ROSE, *Primary Examiner.*

WILLIAM C. COOPER, STEPHEN W. CAPELLI, *Examiners.*